(12) United States Patent
Kawamoto et al.

(10) Patent No.: US 7,225,685 B2
(45) Date of Patent: Jun. 5, 2007

(54) PIPE ASSEMBLY UNIT WITH BUILT-IN FLOW SENSORS

(75) Inventors: Takahiro Kawamoto, Tokyo (JP); Takayuki Tajima, Tokyo (JP)

(73) Assignee: TOFLO Corporation, Tokyo (JP)

( * ) Notice: Subject to any disclaimer, the term of this patent is extended or adjusted under 35 U.S.C. 154(b) by 0 days.

(21) Appl. No.: 11/463,478

(22) Filed: Aug. 9, 2006

(65) Prior Publication Data

US 2007/0044574 A1 Mar. 1, 2007

(30) Foreign Application Priority Data

Aug. 24, 2005 (JP) ............................. 2005-242382

(51) Int. Cl.
*G01F 15/00* (2006.01)
(52) U.S. Cl. ................................................ 73/861.77
(58) Field of Classification Search ............. 73/861.77, 73/863.95; 422/100
See application file for complete search history.

(56) References Cited

U.S. PATENT DOCUMENTS

| | | | | |
|---|---|---|---|---|
| 3,563,484 | A | * | 2/1971 | Bray, Jr. .................. 242/563.1 |
| 4,228,353 | A | * | 10/1980 | Johnson .................... 250/356.1 |
| 5,761,916 | A | | 6/1998 | Oswalt |
| 6,038,933 | A | * | 3/2000 | Meyer .................... 73/862.045 |
| 6,852,288 | B2 | * | 2/2005 | Newberg .................... 422/100 |

FOREIGN PATENT DOCUMENTS

| | | |
|---|---|---|
| DE | 16 79 567 U1 | 7/1954 |
| DE | 78 16 675 U1 | 9/1978 |
| DE | 29 10 529 U1 | 9/1980 |
| DE | 43 24 867 A1 | 1/1995 |
| EP | 0 922 941 A1 | 6/1999 |
| EP | 1 045 209 A2 | 10/2000 |
| GB | 2 285 302 A | 7/1995 |
| JP | 11 173884 | 7/1999 |
| JP | 01 136423 U | 9/1999 |

* cited by examiner

*Primary Examiner*—Jewel Thompson
(74) *Attorney, Agent, or Firm*—Norris McLauglin & Marcus PA

(57) ABSTRACT

Cost is reduced by simplifying piping work and reducing the number of parts. At the same time, the degree of freedom in the arrangement of piping is raised by making the mounting posture of the piping variable. A pipe assembly unit with built-in sensors is fabricated by integrating a main pipe and multiple branch pipes, which branch from the main pipe and by building, in the multiple branch pipes a flow sensor which detects the flow rate of a fluid flowing through a conduit of each of the branch pipes, and the use of a conventional seal construction using a nipple in connections between the main pipe and the branch pipes is abolished. A pipe adapter having legs is detachably attached to opening ends of the main pipe and the legs are fixed to an installation surface A by changing the orientation of the pipe adapter, whereby the mounting posture of the pipe assembly unit is made variable.

17 Claims, 8 Drawing Sheets

PIPE ASSEMBLY UNIT WITH BUILT-IN FLOW SENSORS

BACKGROUND OF THE INVENTION

1. Field of the Invention

The present invention relates to a pipe assembly unit with built-in flow sensors in which a main pipe and branch pipes are integrated.

2. Description of the Related Art

There has hitherto been known a piping construction in which a pipe assembly is formed by connecting a main pipe and branch pipes of multiple systems and a flow sensor is mounted to each of the multiple branch pipes, whereby the monitoring of flow rates is performed. In the case of a piping construction of this kind, it is necessary to perform the connection of the main pipe and the branch pipes and the connection of the branch pipes and the flow sensors for each number of the systems of the branch pipes. At present, therefore, workers are forced to perform troublesome piping work.

In connecting these pipes, seal tape is wound around a nipple in order to prevent liquid leakage from a connection and sealing is performed by screwing the nipple with tape into the connection. In the case of this method, the seal tape is crushed when the nipple is screwed in, with the result that the sealing properties are improved. On the other hand, because the nipple becomes buried as it becomes screwed in and the height of the nipple decreases, it is difficult to adjust the length of the whole piping. Besides, the orientation of connected pipes must be coordinated at the same time with the length adjustment, and positioning with respect to the assembling direction in the connection is difficult. Thus, very troublesome execution of work has hitherto been required. In addition, the number of parts increases because nipples and seal tape are used in all connections, posing the problem that equipment expenses are high. Incidentally, it is also conceivable to adopt a method in which sealing is performed by applying a liquid gasket to the circumference of a nipple. However, problems similar to those occurring in connection with seal tape still arise even when this method is used.

Against the background of the above circumstances, techniques for making piping work efficient have also been proposed (refer to Japanese Patent Laid-Open No. 11-173884, for example). In the technique disclosed in Japanese Patent Laid-Open No. 11-173884, flow detectors with built-in flow regulating valves are mounted on multiple manifold blocks and the flow detectors are connected by screws, whereby a pipe assembly of multiple systems can be formed. Even in this technique, however, troublesome work for fastening the screws to multiple mounting seats on the manifold blocks cannot be avoided when multiple pipes connect to the flow detectors, and it cannot be said that the burden on workers is completely eliminated. Also, because the mounting posture of the manifold blocks is determined beforehand and the orientation of pipes cannot be made variable, the degree of freedom in the arrangement of piping is low and there is still room for improvement in this respect.

The present invention has been made in view of the above circumstances and has as its object the provision of a pipe assembly unit with built-in flow sensors which enables piping work to be performed with good efficiency, reduces cost by a reduction in the number of parts, and makes mounting positions variable, whereby the degree of freedom in the arrangement of piping can be raised.

SUMMARY OF THE INVENTION

To achieve the above object, the present invention provides a pipe assembly unit with built-in flow sensors in which a pipe assembly of manifold construction is integrally formed with a main pipe and multiple branch pipes, the main pipe having an opening with a square flange at each end thereof and the multiple branch pipes branching from the periphery of the main pipe, the square flange having a bolt-joint hole (threaded hole or bolt-through hole) at each square corner thereof, and each of the multiple branch pipes being provided with a flow sensor which detects the flow rate of a fluid flowing therethrough.

In this pipe assembly unit with built-in flow sensors, the pipe assembly unit further provides with a pipe adapter which is detachably attached face to face to the square flange of the main pipe, the pipe adapter comprising a female threaded portion to communicate with the main pipe, an adapter square flange around the female threaded portion, the adapter square flange having an adapter bolt-joint hole at each square corner thereof, the adapter bolt-joint holes respectively confront the bolt-joint holes of the square flange of the main pipe, and a pair of legs protruding horizontal from a pair of the square corners of the adapter square flange.

In this pipe assembly unit with built-in flow sensors, the adapter square flange is selectively turnable by a 90-degree around an axis of the main pipe so as to connect the pipe adapter to the manifold with four bolts respectively inserting through the adapter bolt-joint holes and the selected corresponding bolt-joint holes to fasten the pipe adapter to the manifold.

Also, the present invention provides a pipe assembly unit with built-in flow sensors having a plurality of pipe assembly manifolds, in which each pipe assembly of manifold construction is integrally formed with a main pipe and multiple branch pipes, the main pipe having an opening with a square flange at each end thereof and the multiple branch pipes branching from the periphery of the main pipe, the square flange having a bolt-joint hole at each square corner thereof, and each of the multiple branch pipes being provided with a flow sensor which detects the flow rate of a fluid flowing therethrough. The square flange of one manifold is selectively turnable by a 90-degree around an axis of the main pipe so as to connect the manifold to another manifold with four bolts respectively inserting through the bolt-joint holes of the former manifold and the selected corresponding bolt-joint holes of the latter to fasten both the manifolds.

The present invention may be such that, in the pipe assembly units with built-in flow sensors of the above-described construction, an arbitrary number of manifolds having two or three branch pipes are combined to each other so as to serve two-and-over pipe line system.

In the present invention of the pipe assembly units with built-in flow sensors of the above-described construction, the flow sensor may be a vane wheel sensor rotating in accordance with fluid passage, in which a magnet is buried in a fin of a vane wheel and the rotation of the vane wheel is converted to a flow rate value, with a frequency of detection of the pulse magnetism caused by the rotation.

In the present invention, each of the multiple branch pipes may be provided with a flow rate indicator capable of indicating at least one of a digital flow rate, an alarm output and an analog output on the basis of a flow rate signal outputted from the flow sensor.

In the present invention, the main pipe and the branch pipes may be integrally fabricated from stainless steel.

According to a pipe assembly unit with built-in flow sensors of the present invention, there is adopted a construction in which a pipe assembly which is integrally formed with a main pipe and multiple branch pipes is used and a flow sensor which detects the flow rate of a fluid flowing through each of the branch pipes is built in each of the multiple branch pipes. Therefore, in the connections of the main pipe and the branch pipes, it becomes unnecessary to use a conventional seal construction in which nipples, seal tape or seal parts such as liquid gaskets are used, and perfect sealing properties which prevent troubles of liquid leakage from occurring can be ensured. At the same time, the positioning accuracy of pipes during assembling and the dimensional accuracy of the length of pipes are remarkably raised. Also, by abolishing the use of sealing parts such as nipples, which have hitherto been necessary in the connection of pipes, it is possible to realize pipe savings and a reduction of the number of parts, and as a result of this, the burden on workers who perform piping work is reduced and equipment expenses can be reduced.

Because of the adoption of the essential feature that the flow sensor is a vane wheel sensor, in which a magnet is buried in an arbitrary fin of a vane wheel which rotates by the passage of a fluid and conversion to a flow rate value is performed on the basis of a frequency obtained by detecting the magnetism of the magnet by use of a magnetic sensor, the construction of the flow sensor is simplified, the work of attaching and detaching the flow sensor to and from the inside of the branch pipe becomes easy, and maintenance can be easily performed.

A user can simultaneously perform the flow rate monitoring of piping liens of multiple systems, because of the adoption of the essential feature that each of the multiple branch pipes is provided with a flow rate indicator capable of taking out at least one of a flow rate indication, an alarm output and an analog output on the basis of a flow rate signal outputted from each of the flow sensors.

A substantial improvement in versatility is achieved, because an arbitrary number of pipe assembly units with built-in flow sensors in each of which two or three branch pipes are used are combined and the main pipes of the combined arbitrary number of units are connected so as to be able to serve piping lines of two or all numbers of systems.

The degree of freedom in the arrangement of piping is raised and excellent convenience is achieved, because by detachably attaching a pipe adapter having legs to the opening ends of the main pipe and fixing the legs to an installation surface by changing the direction of the adapter, whereby the mounting posture of the pipe assembly unit with built-in flow sensors is made variable.

By connecting the main pipes together, with the orientations of the main pipes changed with respect to each other, it is also possible to perform the arrangement of piping in such a manner that the branch pipes integrated into the respective main pipes are installed in directions different from each other. Therefore, the degree of freedom in the execution of piping work is substantially improved.

By integrally fabricating the main pipe and the branch pipes from stainless steel, it is possible to provide a piping construction which is excellent in durability, can be used for a long period and has high reliability.

DETAILED DESCRIPTION OF THE PREFERRED EMBODIMENT

An embodiment of the present invention will be described on the basis of the accompanying drawings.

Figure 1:
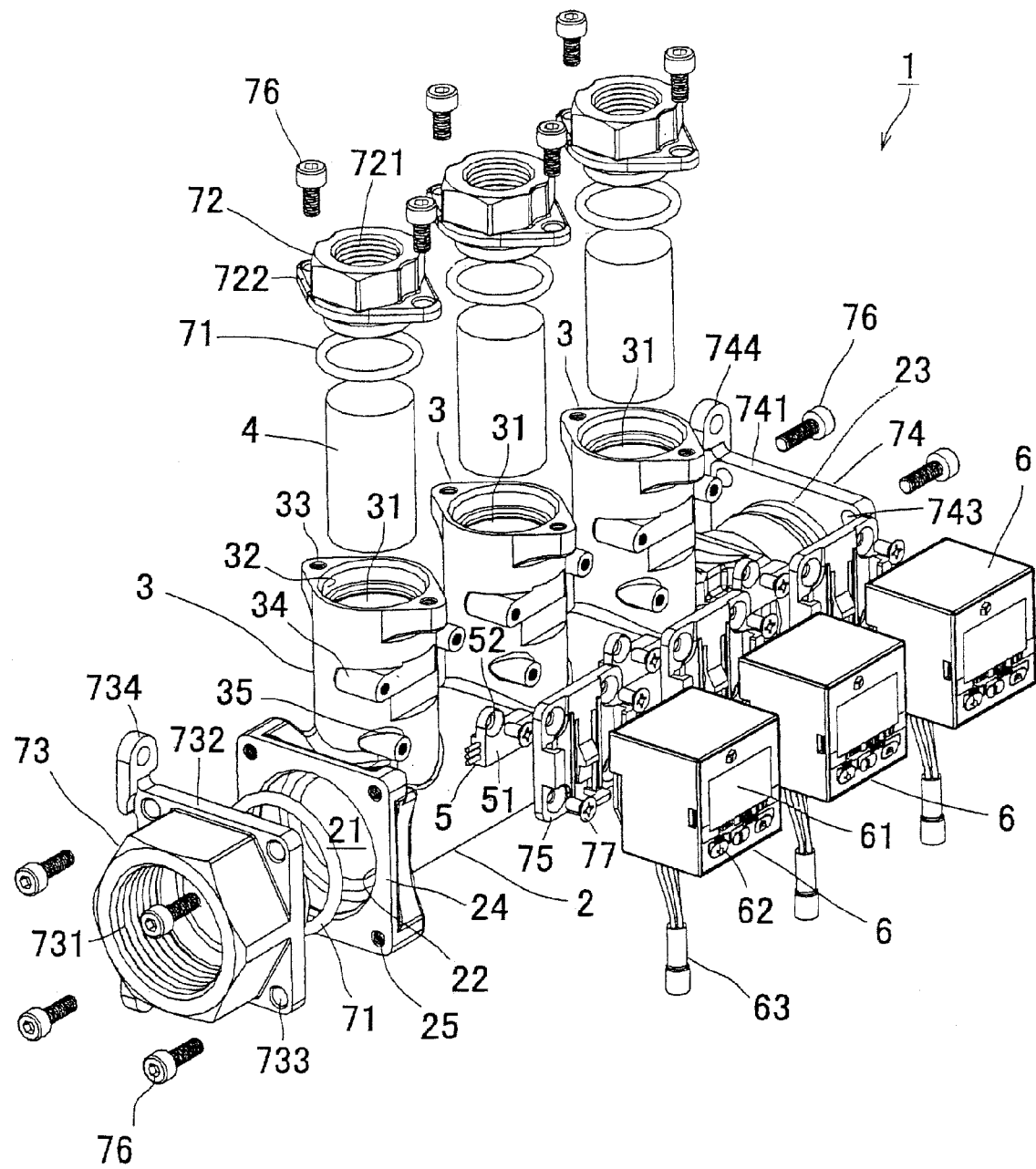
FIG. 1 is an exploded view showing the general construction of a pipe assembly unit with built-in flow sensors of the present invention.
Figure 2:
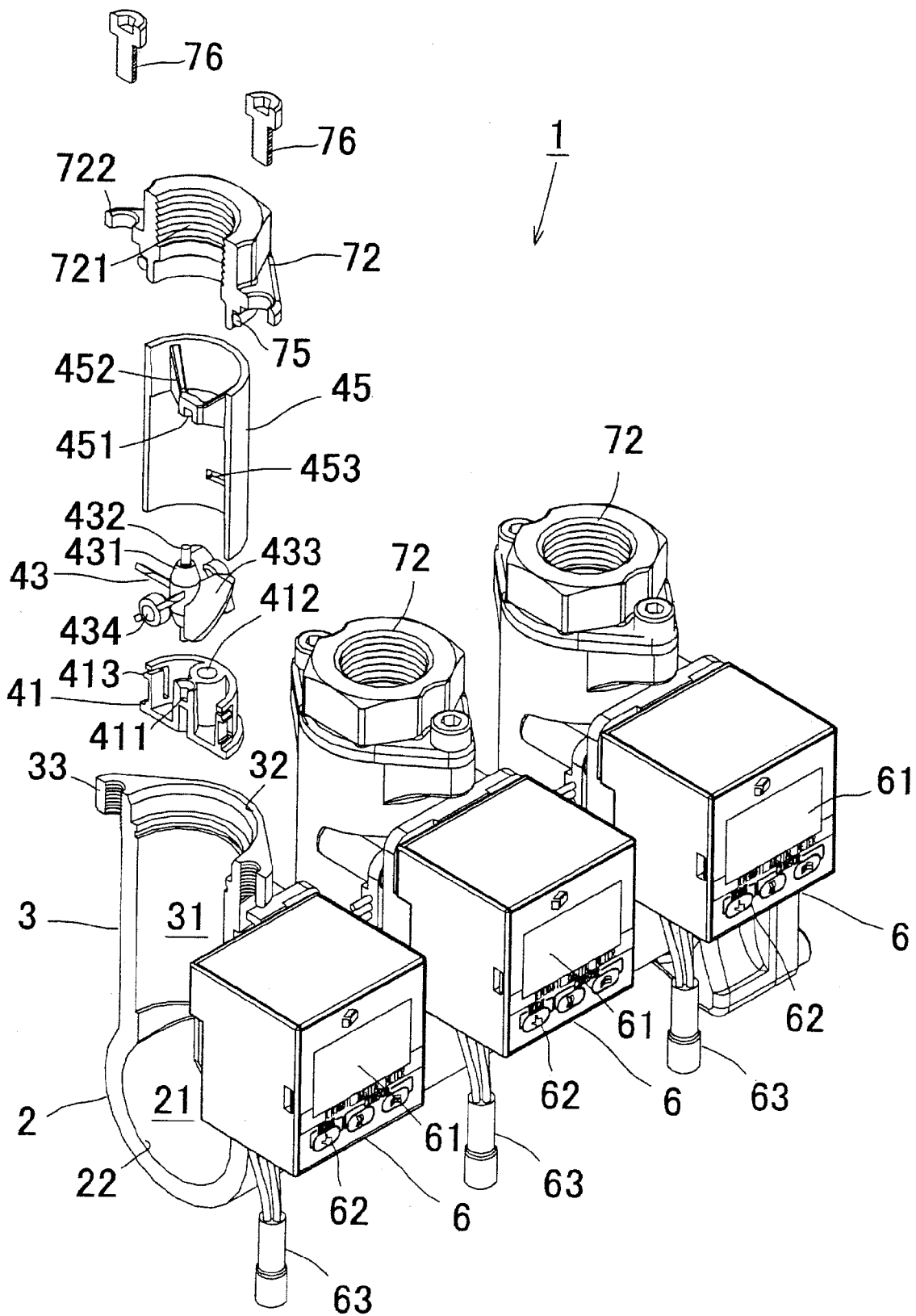
FIG. 2 is an exploded sectional view showing the construction of a flow sensor in the unit.
Figure 3:
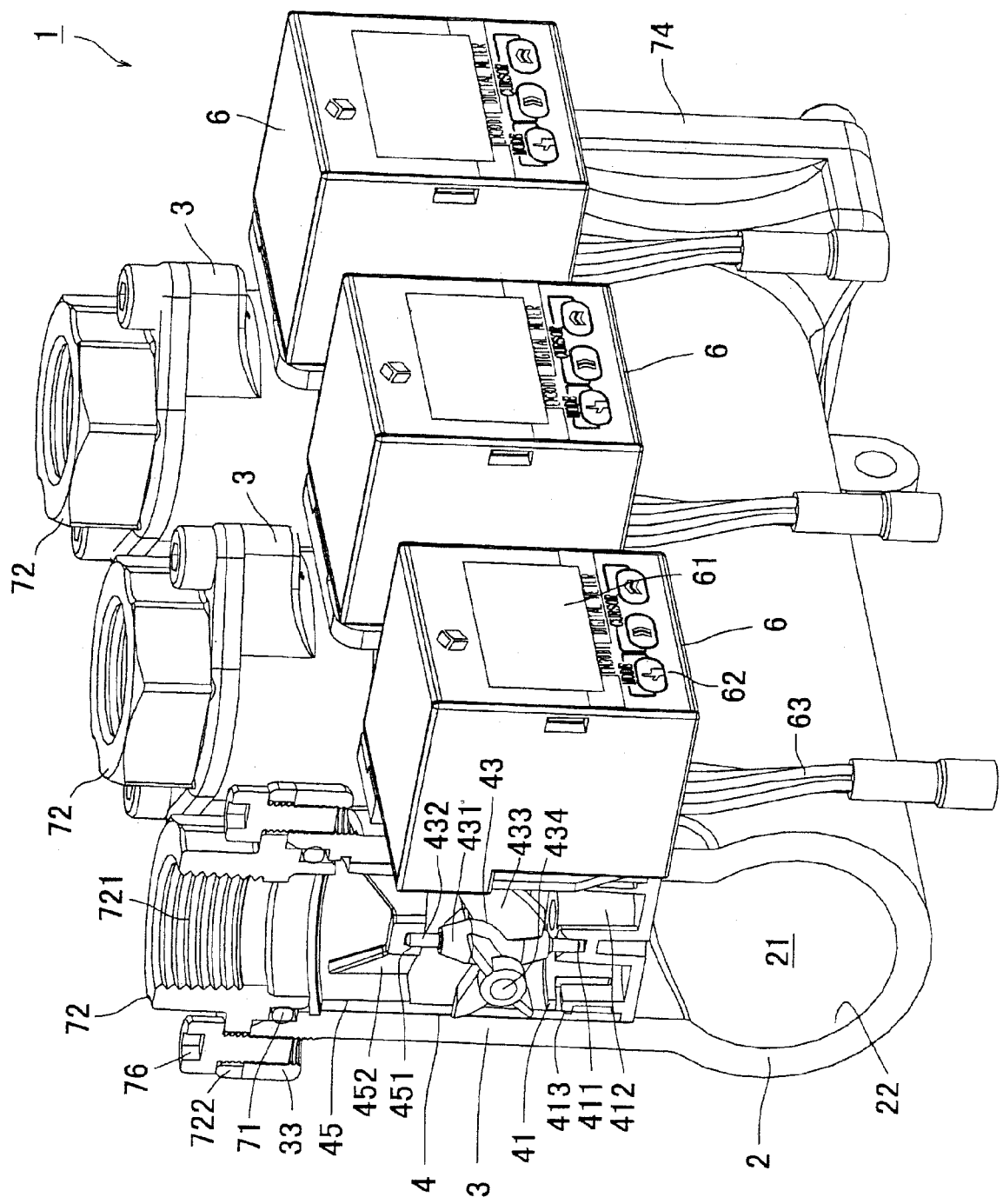
FIG. 3 is an assembled sectional view showing the internal construction of the unit.

First, with reference to FIGS. 1 to 3, the basic construction of a pipe assembly unit with built-in flow sensors of this embodiment will be described. FIG. 1 is an exploded view showing the general construction of a pipe assembly unit with built-in flow sensors. FIG. 2 is an exploded sectional view showing the construction of a flow sensor in the unit. FIG. 3 is an assembled sectional view showing the internal construction of the unit.

A pipe assembly unit with built-in flow sensors (hereinafter abbreviated as a "pipe assembly unit") 1 of this embodiment can be used, in its concrete applications, for example, as a water supply pipe for supplying water to a die apparatus (not shown) and a water discharge pipe, and the pipe assembly unit is characterized by the adoption of a manifold construction in which a main pipe 2 and branch pipes 3, 3, ... which branch from the main pipe 2 of multiple systems (in the example of FIGS. 1 to 3, three systems) are integrated. Because thanks to this manifold construction, a conventional seal construction becomes unnecessary in the connections between the main pipe 2 and the branch pipe, perfect sealing properties which completely prevent troubles of liquid leakage from occurring can be ensured and at the same time, it is possible to achieve pipe savings and a reduction of the number of parts. The bodies of the main pipe 2 and the branch pipes 3 can be fabricated from any materials so long as they are nonmagnetic materials, and various synthetic resin materials and metal materials can be used. Because in this embodiment the main pipe 2 and the branch pipes 3 are integrally fabricated from stainless steel, the pipe assembly unit can be used even when the fluid flowing through the pipes is a chemical liquid and the piping construction is excellent in durability, can be used for a long period and has high reliability.

In a case where the pipe assembly unit 1 shown in FIG. 1 is used as a water supply pipe, in the main pipe 2 an opening 22 at one end of a large-diameter conduit (a main passage) 21 serves as an inlet port of a fluid and an opening 23 at the other end serves as an outlet port. The main passage 21 of the main pipe 2 branches into small-diameter conduits (sub-passages) 31, 31, ... of multiple branch pipes 3, 3, ... and communicates with openings 32, 32 .... As a result of this, a fluid which has flown in from the large-diameter opening 22 at one end passes through the main passage 21 of the main pipe 2 and flows out of the opening 23 at the other end and, at the same time, this fluid also flows into the sub-passages 31 of the branch pipes 3 as split flows and flows out of the small-diameter openings 32.

A flow sensor 4 which detects the flow rate of a fluid flowing through each of the sub-passages 31 is built in the interior of each of the branch pipes 3. As shown in FIG. 1, the flow sensor 4 and an O-ring 71 are inserted in this order into the sub-passage 31 of the branch pipe 3, and a small-diameter-pipe adapter 72 having a female threaded portion 721 and a mounting portion 722 is fastened to an adapter mounting portion 33 at a peripheral edge of the opening 32 by use of a hexagon socket head cap bolt 76. As a result of this, the flow sensor 4 becomes built in the branch pipe 3 and, at the same time, a gap between the branch pipe 3 and the small-diameter-pipe adapter 72 is sealed by the O-ring 71 and high sealing properties are maintained, thereby making it possible to prevent troubles such as liquid leakage. Incidentally, the flow sensor 4, the O-ring 71 and the small-diameter-pipe adapter 72 have a construction common to all of the branch pipes 3, 3, . . . .

Next, the construction of the flow sensor 4 which is built in the branch pipe 3 will be described in detail. In the flow sensor 4 of this embodiment, miniaturization and weight savings are achieved. At the same time, in order to ensure that flow rate measurements can be made when the branch pipe 3 is installed in both of a vertical posture and a horizontal posture, as will be describe later, a sensor of the vane wheel type which is not restricted by mounting postures is adopted. As shown in FIG. 2, this flow sensor 4 is constituted by a base 41, a vane wheel 43 and a casing 45.

A bearing 411 is integrally provided at the center of the base 41, an arbitrary number of straight-pipe portions 412 which communicate with the sub-passage 31 of the branch pipe 3 are provided in a periphery of the bearing 411, and an engaging claw 413 is formed on a outer wall of the base 41. The vane wheel 43 is formed by mounting a rotary shaft 432 to the axis center of a boss portion 431 in circular cylinder shape in a fixed manner, four fins 433, 433, . . . , which are radially and spirally inclined, are formed on the circumference of the boss portion 431, and a magnet 434 is buried in any of the four fins 433 (in the example of the figure, two 180 degrees opposed fins). A bearing 451 is integrally provided at the cylindrical center of the casing 45, a flow regulating plate 452 is radially provided in a protruding manner on the circumference of the bearing 451, and an engaging hole 453 which engages with the above-described engaging claw 413 is opened on the cylindrical outer wall.

In the flow sensor 4 having the above-described construction, after the fitting of the bottom end of the rotary shaft 432 of the vane wheel 43 into the bearing 411 of the base 41, the casing 45 is put thereon, the top end of the rotary shaft 432 is then fitted into the bearing 451 of the casing 45, and lastly the engaging claw 413 is combined to the engaging hole 453, whereby as shown in FIG. 3, the three parts of base 41, vane wheel 43 and casing 45 are integrated with each other. As a result of this, the vane wheel 43 is supported by the base 41 and the casing 45 so as to be rotatable around the shaft thereof. And the fluid which flows through the sub-passage 31 of the branch pipe 43 is caused to flow straight by the straight-pipe portion 412, flows into the flow sensor 4, strikes the fin 433 and rotates the vane wheel 43, with the result that the fluid becomes swirling currents by the action of the spiral fin 433 and the flow regulating plate 452 and flows from the opening 32 to the outside.

As stated above, in the flow sensor 4 of this embodiment, an axial flow in which the flow of a fluid is caused to strike the plane of rotation of the vane wheel 43 perpendicularly thereto is adopted. Therefore, because small axial stresses are sufficient, troubles little occur and long life designs can be achieved. Furthermore, because it is necessary only that the three parts which are integrated beforehand, i.e., the base 41, the vane wheel 43 and the casing 45 be inserted into the cylinder of the branch pipe 3, this provides also the advantage that the attaching and detaching work of the flow sensor 4 becomes very simple and that maintenance can be easily performed.

On the other hand, a sensor of magnetic detection type is adopted in this embodiment as a detection section 5 which detects the rotary motion of the flow sensor 4. As shown in FIG. 1, the detection section 5 comprises a hole IC sensor 51 and is fixed to an outer wall of the branch pipe 3 by screwing a screw 77, which has been passed through a mounting hole 52 of the sensor, into an IC mounting portion 34.

The hole IC sensor 51 is a noncontact type magnetic sensor, in which there is built a circuit board (not shown) completed as a chip, which comprises a hole element which converts magnetism to voltage by utilizing the hole effect, a power circuit, an amplifier, a Schmidt trigger and a transistor (output stage), and the sensor has the function of outputting signals by detecting magnetism. That is, when a fluid passes through the interior of the branch pipe 3, the magnet 434 also rotates in conjunction with the rotation of the vane wheel 43, and each time the magnet 434 passes, the magnetism passes through the branch pipe 3 fabricated from a nonmagnetic material and is outputted to the outside. On the other hand, when the hole element of the hole IC sensor 51 mounted outside detects the magnetism, a potential difference is generated in the element. The amplifier takes out the potential difference, and when the Schmidt trigger detects a value of potential difference which is higher than a maximum or lower than a minimum, the transistor (output stage) outputs ON/OFF (Lo/Hi) digital signals.

In this embodiment, flow rate indicators 6, 6, . . . are provided for each of the branch pipes 3, 3, . . . , and it is ensured that a digital flow rate indication, an alarm output and an analog output, which are described below, are simultaneously taken out. The flow rate indicator 6 is detachably attached to the branch pipe 3 via a bracket 75 shown in FIG. 1. That is, the bracket 75 is fixed to a bracket mounting portion 35 on the outer wall of the branch pipe 3 by screws 77 and the flow rate indicator 6 is snapped on the bracket 75 at the back panel.

For the flow rate indication, the circuit board (not shown), which is built in the flow rate indicator 6, finds a frequency from a time axis and a detected number (a digital signal) detected by the above-described hole IC sensor 51 and converts the frequency into a flow rate. A CPU and a memory are built in the internal circuit board, and data (constants) for converting a frequency into a flow rate are stored. Conversion into a flow rate value (an instantaneous flow rate or an integrated flow rate) is performed on the basis of the data, and the flow rate value (1/min) is indicated in numerals in a display section 61 which is present outside the flow rate indicator 6. As a result of this, it is possible to simultaneously monitor flow rates of pipe lines of multiple systems.

For the alarm output, a contact type or noncontact type switch is built in the flow rate indicator 6, and this switch outputs an alarm when a detected value exceeds a standard flow rate value arbitrarily set as a condition for giving an alarm or when a detected value is lower than the standard flow rate value. By operating various buttons of a controller section 62 which is present outside, it is possible to change the setting of the standard flow rate value and modes of conditions. Incidentally, the alarm output is taken out to the outside by a signal cable 63.

For the analog output, a value converted in the interior of the flow rate indicator 6 is converted as an output proportional to a flow rate value by use of an internal D/A converter and outputted to the outside as an electric current output (4 to 20 mA) or a voltage output (1 to 5V, DC) via the signal cable 63, and hence it is also possible to perform external flow rate monitoring.

Incidentally, although the flow rate indicator 6 of this embodiment can simultaneously take out a flow rate indication, an alarm output and an analog output, it is not always necessary that all of the three be capable of being taken out. For example, it is also possible to adopt a type which can take out any one of a flow rate indication, an alarm output and an analog output, a type which can take out a flow rate indication and an alarm output, a type which can take out a flow rate indication and an analog output, or a type which can take out an alarm output and an analog output.

Figure 4:
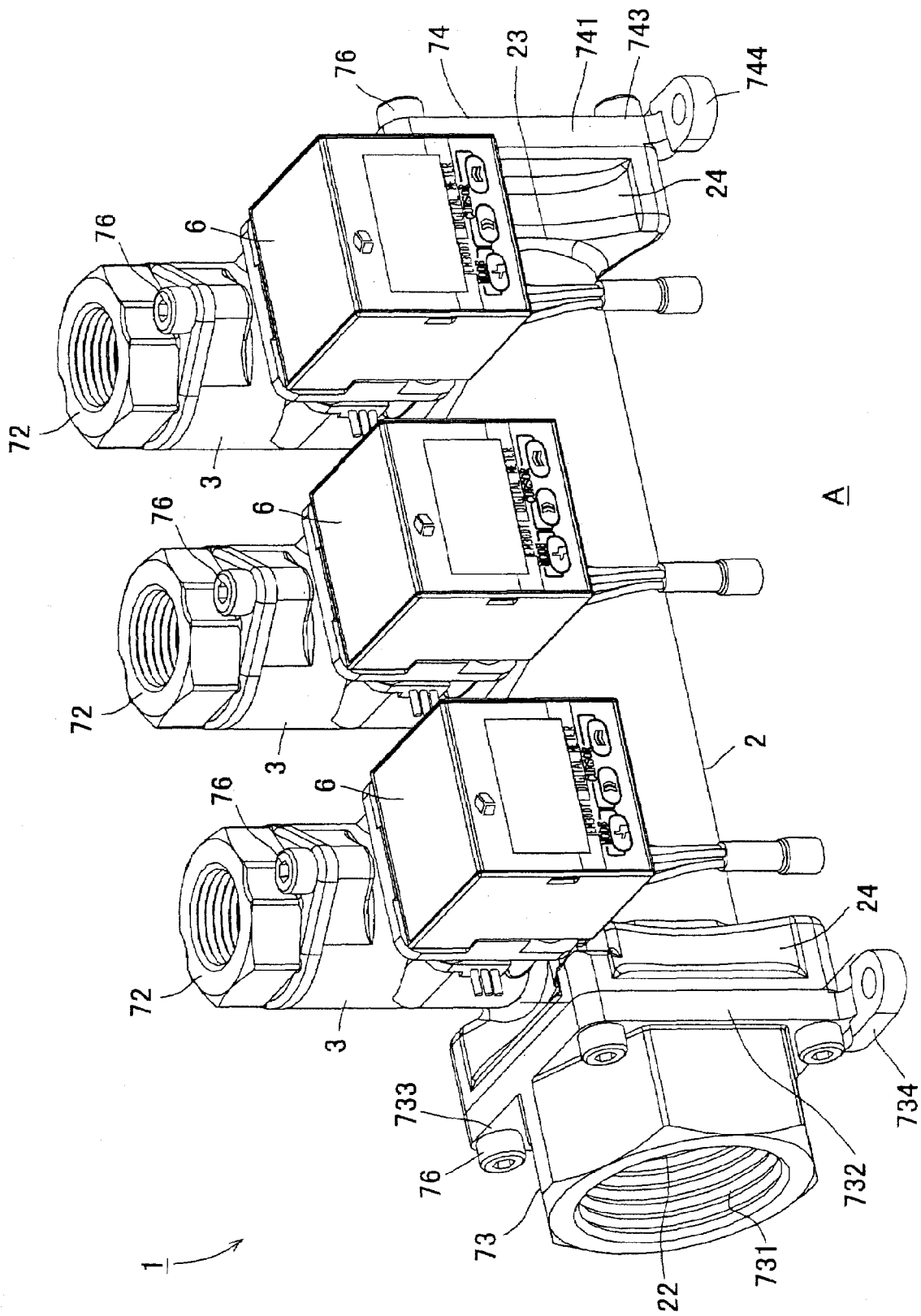
FIG. 4 is an appearance view showing an example in which branch pipes of the unit are installed in a vertical posture.
Figure 5:
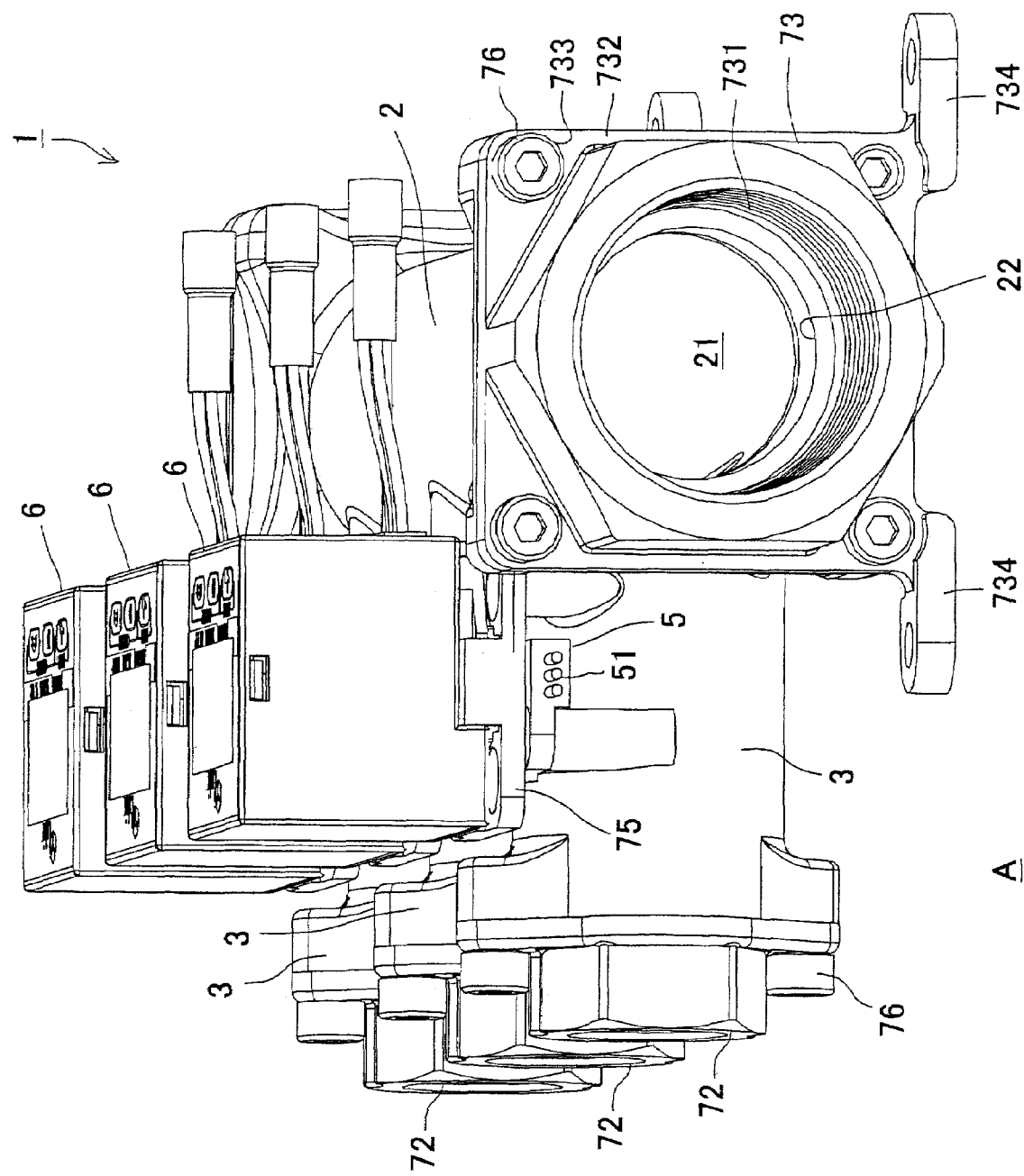
FIG. 5 is an appearance view showing an example in which branch pipes of the unit are installed in a horizontal posture.
Figure 6:
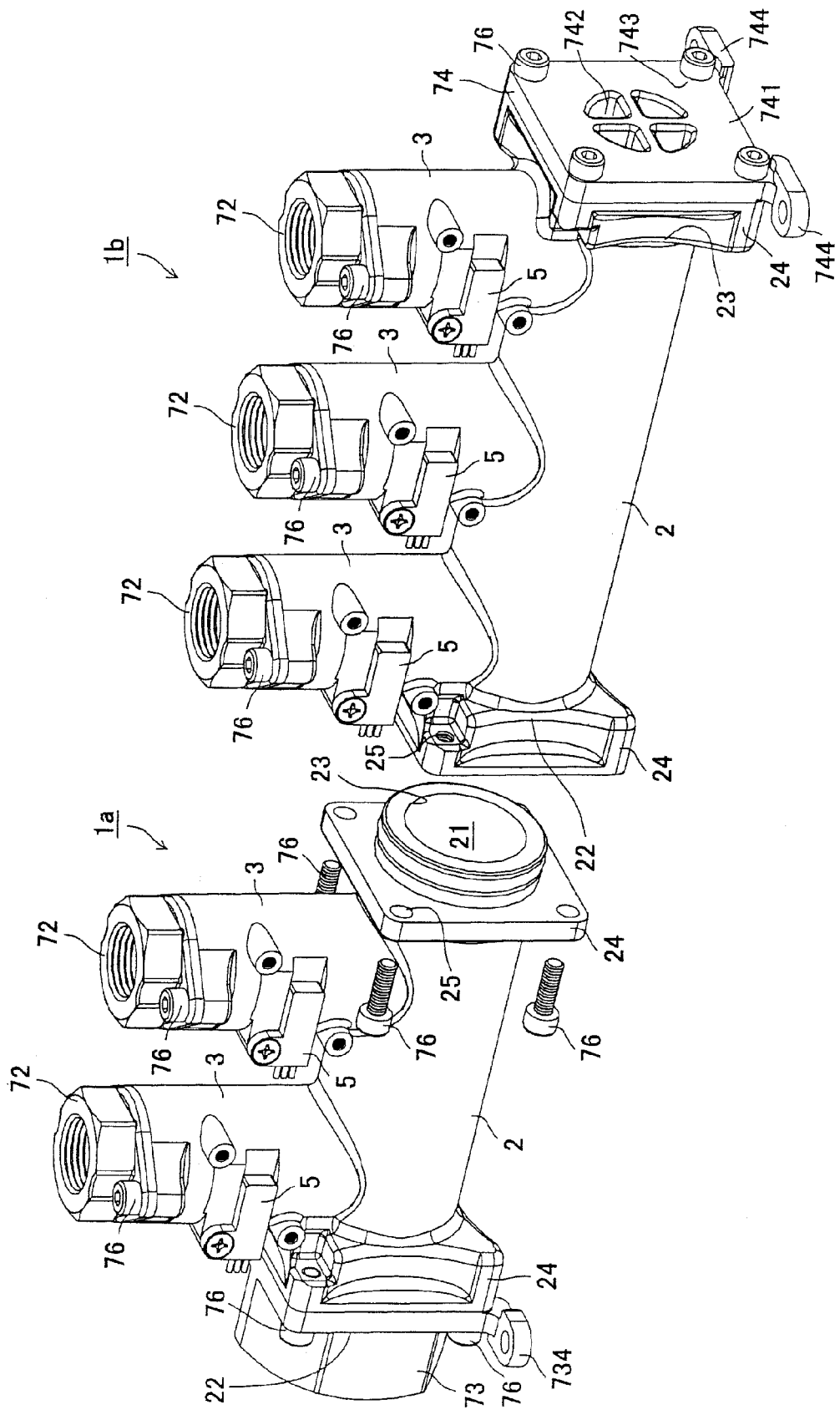
FIG. 6 is an appearance view showing an example in which a multiple number of units are connected.
Figure 7:
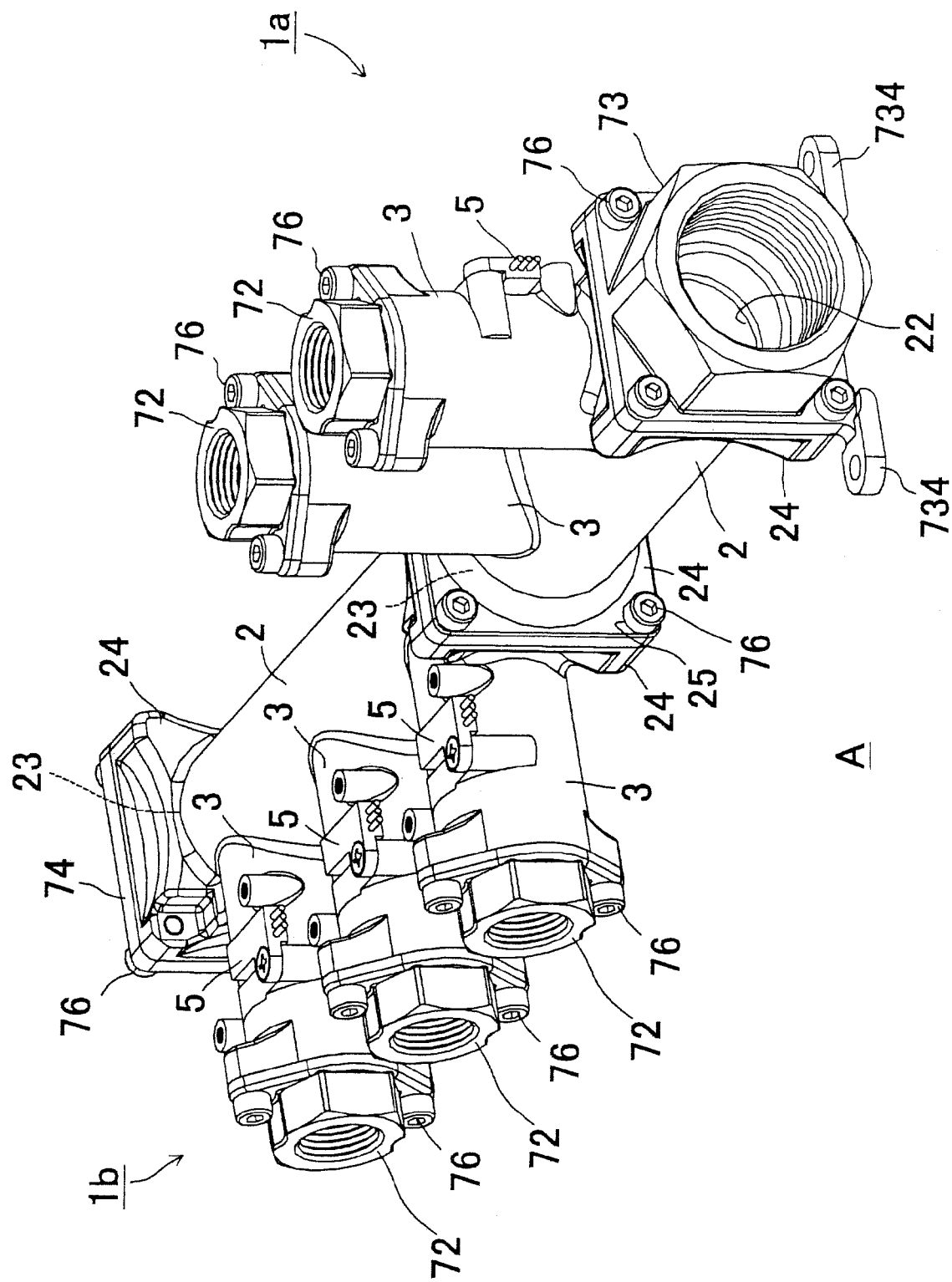
FIG. 7 is an appearance view showing an example in which a multiple number of units are connected and two groups of branch pipes are provided in directions 90 degrees different from each other.
Figure 8:
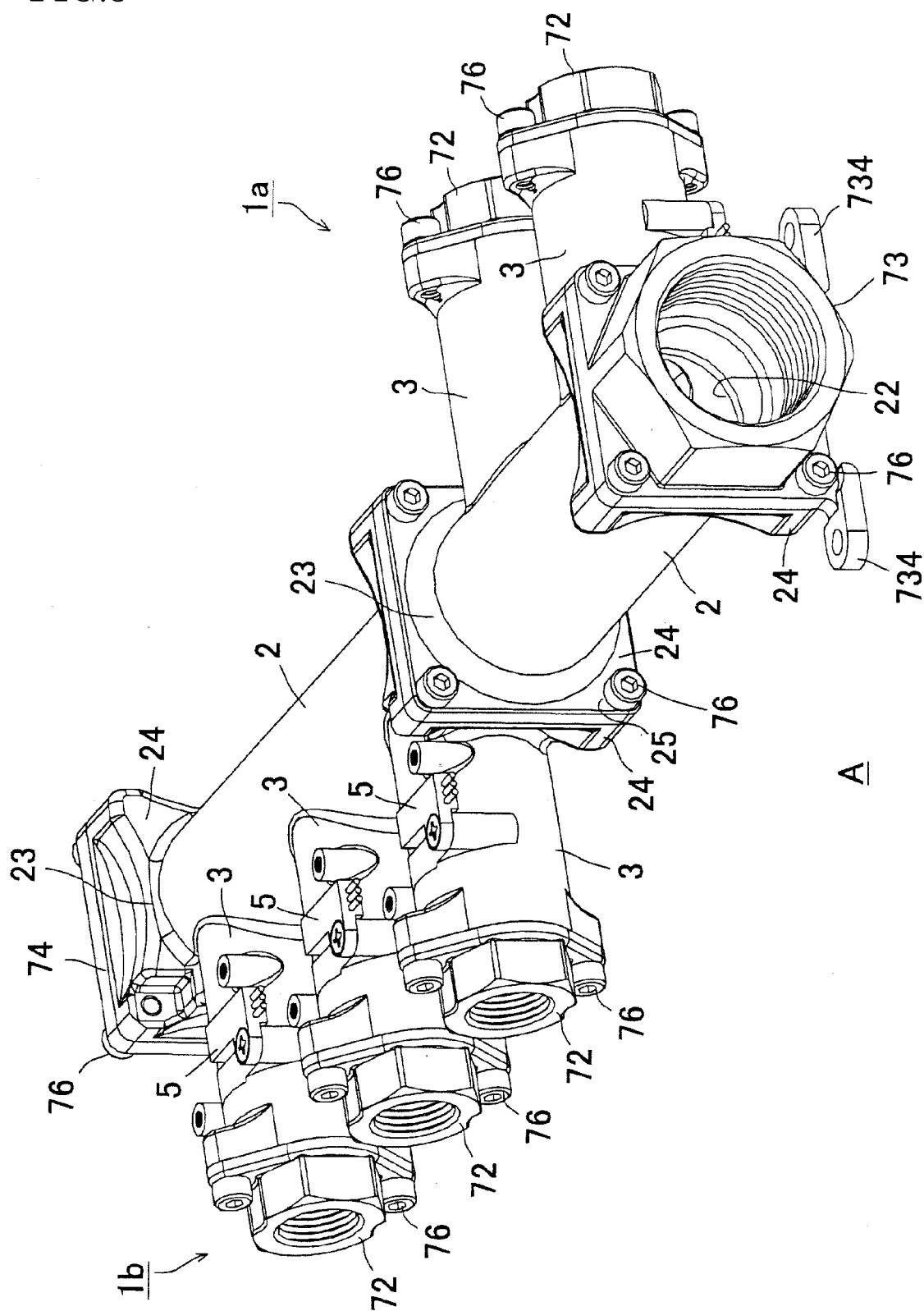
FIG. 8 is an appearance view showing an example in which a multiple number of units are connected and two groups of branch pipes are provided in directions 180 degrees different from each other.

The foregoing is the basic construction of the pipe assembly unit 1 of this embodiment. In the following, examples of installation of this pipe assembly unit 1 will be described by referring to FIGS. 4 to 8. FIG. 4 is an appearance view showing an example in which branch pipes of the pipe assembly unit are installed in a vertical posture. FIG. 5 is an appearance view showing an example in which branch pipes of the unit are installed in a horizontal posture. FIG. 6 is an appearance view showing an example in which a multiple number of units are connected. FIG. 7 is an appearance view showing an example in which a multiple number of units are connected and two groups of branch pipes are provided in directions 90 degrees different from each other. FIG. 8 is an appearance view showing an example in which a multiple number of units are connected and two groups of branch pipes are provided in directions 180 degrees different from each other.

First, as shown in FIG. 4, it is possible to install a pipe assembly unit 1 in such a manner that a branch pipe 3 takes a vertical posture with respect to an installation surface A. In a case where the pipe assembly unit 1 shown in the figure is used as a water supply pipe, an opening 22 at one end of a main pipe 2 serves as an inlet port. A pipe adapter 73 is attached to this opening 22 at one end and a plug adapter 74 into which a plug for a stock cock is inserted is attached to an opening 23 at the other end.

The pipe adapter 73 consists of a female threaded portion 731 and an adapter square flange 732. The female threaded portion 731 is to communicate with the conduit 21 of the main pipe 2 and the adapter square flange 732 is disposed around the female threaded portion 731. The adapter square flange 732 has four bolt-joint holes 733, 733, . . . (through holes for receiving a bolt in this case) at its every square corner. The bolt-joint holes 733, 733, . . . are to be respectively confronted the bolt-joint holes (threaded holes in this case) 25, 25, . . . of the square flange 24 of the main pipe 2. The adapter square flange 732 further has a pair of legs 734, 734 which protrude horizontal from a pair of the square corners.

The plug adapter 74 has a plug hole 742 (refer to FIG. 6) at the center of a flat plate portion 741, through holes 743, 743, . . . are opened in four places of a peripheral edge of the flat plate portion 741, and a pair of legs 744, 744 is provided in two adjacent places of the through holes.

In order to set the branch pipe 3 in a vertical posture, the adapter square flange 732 is caused to abut against the square flange 24 of the main pipe in such an orientation that the leg 734 of the pipe adapter 73 becomes perpendicular to the axis line of the branch pipe 3, and the adapter square flange 732 is fastened to the square flange 24 of the main pipe 2 by inserting a hexagon socket head cap bolt 76 through the mounting hole 733. Fastening is performed in the same way also for a plug adapter 74. And by fixing the leg 734 of the pipe adapter 73 and the leg 744 of the plug adapter 74 to the installation surface A, it is possible to install the branch pipe 3 of the pipe assembly unit 1 in a condition upright with respect to the installation surface A.

As shown in FIG. 5, it is also possible to install a pipe assembly unit 1 in such a manner that a branch pipe 3 takes a horizontal posture with respect to an installation surface A. In this case, the square flanges are caused to abut against each other in such an orientation that the leg 734 of the pipe adapter 73 becomes horizontal to the axis line of the branch pipe 3, and the adapter square flange 732 is fastened to the square flange 24 of the main pipe 2 by inserting a hexagon socket head cap bolt 76 through the mounting hole 733. At the same time, fastening is performed in the same way also for a plug adapter 74. And by fixing the leg 734 of the pipe adapter 73 and the leg 744 of the plug adapter 74 to the installation surface A, it is possible to install the branch pipe 3 of the pipe assembly unit 1 in a condition lying with respect to the installation surface A.

Furthermore, as shown in FIG. 6, it is also possible to connect a multiple number of pipe assembly units (pipe assembly manifold) 1. In the example of the figure, a pipe assembly unit 1a in which the number of branch pipes 3 is two and a pipe assembly unit 1b in which the number of branch pipes 3 is three are combined, whereby a pipe assembly which consists of two units has branch pipes 3 of five systems is fabricated. For the convenience of explanation, the illustration of a flow rate indicator 6 is omitted in the figure. In the case of this example, a square flange 24 present at an opening 23 at the other end of the pipe assembly unit 1a of two systems and a square flange 24 present at an opening 22 at one end of the pipe assembly unit 1b of three systems are caused to abut against each other and a hexagon socket head cap bolt 76 is fastened to mounting holes 25, 25 of the two, whereby the two units 1a and 1b can be connected to each other. Incidentally, a pipe adapter 73 is attached to the opening 22 at one end of the pipe assembly unit 1a of two systems and a plug for a stop cock is attached to the opening 23 at the other end of the pipe assembly unit 1b of three systems via a plug adapter 74 in the same manner as the cases of FIGS. 4 and 5.

As described above, according to the pipe assembly unit 1 of this embodiment, by arbitrarily combining the pipe assembly unit 1a of two systems (even number) and the pipe assembly unit 1b of three systems (odd number) and combining the main pipes 2, 2 of the two units together, the present invention provides the advantage that pipe assembly unit 1 is able to serve piping lines of two or all numbers of systems. Furthermore, because the pipe adapter 73 can be attached to the opening 22 at one end of the main pipe 22 and the opening 23 at the other end thereof by freely changing the orientation of the pipe adapter 73, it is possible to make the mounting posture of the pipe assembly unit 1 variable and the degree of freedom in the arrangement of piping can be substantially improved. In addition, because pipes can be connected only by pipe adapters in place of a conventional method by nipples, it is possible to remarkably raise both of the positioning accuracy of piping during assembling and the dimensional accuracy of pipe length.

As further examples, it is also possible to connect a multiple of pipe assembly units 1 and two groups of branch pipes are provided in directions different from each other.

In an example shown in FIG. 7, a pipe assembly having branch pipes 3 of five systems is fabricated by connecting a pipe assembly unit 1a of two systems and a pipe assembly unit 1b of three systems, and two groups of branch pipes in the two units 1a, 1b are provided so as to face directions 90 degrees different from each other. Also in this figure, for the convenience of explanation, the illustration of a flow rate indicator 6 is omitted. In the case of this example, the branch pipe 3 of the pipe assembly unit 1a of two systems is provided by being caused to stand perpendicularly to an installation surface A, whereas the branch pipe 3 of the pipe assembly unit 1b of three systems is provided by being caused to lie horizontally to the installation surface A. A pipe adapter 73 is attached to an opening 22 at one end of the pipe assembly unit 1a of two systems and a leg 734 of the pipe adapter 73 is fixed to the installation surface A. At the same time, a plug for a stop cock is attached to an opening 23 at the other end of the pipe assembly unit 1b of three systems via a plug adapter 74 and a leg 744 (refer to FIG. 6) of the plug adapter 74 is fixed to the installation surface A. And a square flange 24 present at the opening 23 at the other end of the pipe assembly unit 1a of two systems and a square flange 24 present at the opening 22 at one end of the pipe assembly unit 1b of three systems are caused to abut against each other and a hexagon socket head cap bolt 76 is fastened to mounting holes 25, 25 of the two, whereby the two units 1a and 1b can be connected to each other.

In contrast to this, in an example shown in FIG. 8, a pipe assembly having branch pipes 3 of five systems is fabricated by connecting a pipe assembly unit 1a of two systems and a pipe assembly unit 1b of three systems, and two groups of branch pipes 3 in the two units 1a, 1b are provided so as to face directions 180 degrees different from each other. In the case of this example, unlike the example of FIG. 7, the branch pipe 3 of the pipe assembly unit 1a of two systems is provided by being caused to lie horizontally toward the right side of the figure, whereas the branch pipe 3 of the pipe assembly unit 1b of three systems is provided by being caused to lie horizontally toward the reverse side, i.e., left side of the figure. Incidentally, a pipe adapter 73 is attached to an opening 22 at one end of the pipe assembly unit 1a of two systems and at the same time, a plug for a stop cock is attached to an opening 23 at the other end of the pipe assembly unit 1b of three systems via a plug adapter 74, whereby square flanges 24 of the two units 1a and 1b are caused to abut against each other. This point is the same as in the example of FIG. 7.

As is apparent from the above-described concrete examples, according to the present invention, by connecting the main pipes 2, 2, . . . in a multiple number of pipe assembly units 1, 1, . . . , with the orientation of the main pipes 2, 2, . . . changed, it becomes possible to perform the arrangement of piping in such a manner that two groups of branch pipes 3, 3, . . . which are integrated into each of the main pipes 2 are caused to face directions different from each other. Therefore, the degree of freedom in the arrangement of piping can be substantially improved. Incidentally, the number of systems of pipe assembly units 1 which are connected and the orientation of the branch pipe 3 are not limited to the examples of FIGS. 7 and 8, and can be appropriately changed according to the environment in which the pipe assembly units 1 are installed.

What is claimed is:

1. A pipe assembly unit with built-in flow sensors in which a pipe assembly of manifold construction is integrally formed with a main pipe and multiple branch pipes, the main pipe having an opening with a square flange at each end thereof and the multiple branch pipes branching from the periphery of the main pipe, the square flange having a bolt-joint hole at each square corner thereof, and each of the multiple branch pipes being provided with a flow sensor which detects the flow rate of a fluid flowing therethrough, the pipe assembly unit further provides with a pipe adapter which is detachably attached face to face to the square flange of the main pipe, the pipe adapter comprising a female threaded portion to communicate with the main pipe, an adapter square flange around the female threaded portion, the adapter square flange having an adapter bolt-joint hole at each square corner thereof, the adapter bolt-joint holes respectively confront the bolt-joint holes of the square flange of the main pipe, and a pair of legs protruding horizontal from a pair of the square corners of the adapter square flange, wherein the adapter square flange is selectively turnable by a 90-degree around an axis of the main pipe so as to connect the pipe adapter to the manifold with four bolts respectively inserting through the adapter bolt-joint holes and the selected corresponding bolt-joint holes to fasten the pipe adapter to the manifold.

2. A pipe assembly unit with built-in flow sensors having a plurality of pipe assembly manifolds, in which each pipe assembly of manifold construction is integrally formed with a main pipe and multiple branch pipes, the main pipe having an opening with a square flange at each end thereof and the multiple branch pipes branching from the periphery of the main pipe, the square flange having a bolt-joint hole at each square corner thereof, and each of the multiple branch pipes being provided with a flow sensor which detects the flow rate of a fluid flowing therethrough, wherein the square flange of one manifold is selectively turnable by a 90-degree around an axis of the main pipe so as to connect the manifold to another manifold with four bolts respectively inserting through the bolt-joint holes of the former manifold and the selected corresponding bolt-joint holes of the latter to fasten both the manifolds.

3. The pipe assembly unit with built-in flow sensors according to claim 2, wherein an arbitrary number of manifolds having two or three branch pipes are combined to each other so as to serve two-and-over pipe line system.

4. The pipe assembly unit with built-in flow sensors according to claim 1, wherein the flow sensor is a vane wheel sensor rotating in accordance with fluid passage, in which a magnet is buried in a fin of a vane wheel and the rotation of the vane wheel is converted to a flow rate value, with a frequency of detection of the pulse magnetism caused by the rotation.

5. The pipe assembly unit with built-in flow sensors according to claim 1, wherein each of the multiple branch pipes is provided with a flow rate indicator capable of indicating at least one of a digital flow rate, an alarm output and an analog output on the basis of a flow rate signal outputted from the flow sensor.

6. The pipe assembly unit with built-in flow sensors according to claim 4, wherein each of the multiple branch pipes is provided with a flow rate indicator capable of indicating at least one of a digital flow rate, an alarm output and an analog output on the basis of a flow rate signal outputted from the flow sensor.

7. The pipe assembly unit with built-in flow sensors according to claim 1, wherein the main pipe and the branch pipes are integrally fabricated from stainless steel.

8. The pipe assembly unit with built-in flow sensors according to claim 4, wherein the main pipe and the branch pipes are integrally fabricated from stainless steel.

9. The pipe assembly unit with built-in flow sensors according to claim 5, wherein the main pipe and the branch pipes are integrally fabricated from stainless steel.

10. The pipe assembly unit with built-in flow sensors according to claim 6, wherein the main pipe and the branch pipes are integrally fabricated from stainless steel.

11. The pipe assembly unit with built-in flow sensors according to claim 2, wherein the flow sensor is a vane wheel sensor rotating in accordance with fluid passage, in which a magnet is buried in a fin of a vane wheel and the rotation of the vane wheel is converted to a flow rate value, with a frequency of detection of the pulse magnetism caused by the rotation.

12. The pipe assembly unit with built-in flow sensors according to claim 2, wherein each of the multiple branch pipes is provided with a flow rate indicator capable of indicating at least one of a digital flow rate, an alarm output and an analog output on the basis of a flow rate signal outputted from the flow sensor.

13. The pipe assembly unit with built-in flow sensors according to claim 11, wherein each of the multiple branch pipes is provided with a flow rate indicator capable of indicating at least one of a digital flow rate, an alarm output and an analog output on the basis of a flow rate signal outputted from the flow sensor.

14. The pipe assembly unit with built-in flow sensors according to claim 2, wherein the main pipe and the branch pipes are integrally fabricated from stainless steel.

15. The pipe assembly unit with built-in flow sensors according to claim 11, wherein the main pipe and the branch pipes are integrally fabricated from stainless steel.

16. The pipe assembly unit with built-in flow sensors according to claim 12, wherein the main pipe and the branch pipes are integrally fabricated from stainless steel.

17. The pipe assembly unit with built-in flow sensors according to claim 13, wherein the main pipe and the branch pipes are integrally fabricated from stainless steel.

* * * * *